(12) United States Patent
Kawamoto

(10) Patent No.: US 6,224,656 B1
(45) Date of Patent: May 1, 2001

(54) CLEANER FOR BOTH DRY AND WET USE HAVING A MOVEABLE RING CONNECTED TO A FAN, THE MOVEABLE RING HAVING CIRCUMFERENTIAL RIBS

(75) Inventor: Eiichi Kawamoto, Tokyo (JP)

(73) Assignee: Sankyo Rayjac Co., Ltd., Tokyo (JP)

( * ) Notice: Subject to any disclaimer, the term of this patent is extended or adjusted under 35 U.S.C. 154(b) by 0 days.

(21) Appl. No.: 09/417,543

(22) Filed: Oct. 14, 1999

(51) Int. Cl.[7] .......................... B01D 47/02; B01D 45/14
(52) U.S. Cl. ................. 96/331; 96/333; 96/351; 96/359; 55/DIG. 3; 15/353
(58) Field of Search .............. 96/333, 351, 359, 96/FOR 138, FOR 150, 331; 55/403, DIG. 3; 15/353

(56) References Cited

U.S. PATENT DOCUMENTS

| | | | |
|---|---|---|---|
| 4,382,804 | * | 5/1983 | Mellor ............................. 55/DIG. 3 |
| 4,673,422 | * | 6/1987 | Tidwell .................................. 96/333 |
| 5,902,386 | | 5/1999 | Gustafson et al. ...................... 96/333 |

\* cited by examiner

*Primary Examiner*—Duane Smith
*Assistant Examiner*—Robert A. Hopkins
(74) *Attorney, Agent, or Firm*—Sughrue, Mion, Zinn, Macpeak & Seas, PLLC

(57) ABSTRACT

A cleaner for both dry and wet use capable of sucking not only a solid but also a semisolid and liquid. The cleaner comprises a suction member; a fan for gas-liquid separation which rotates by operation of the suction member; a movable ring disposed above the fan so as to rotate together with the fan; a housing containing at least a part of an upper end side of the movable ring; and a tank below the housing, in which a liquid is stored and at least a part of a lower end side of the fan is contained, wherein through holes are formed in a circumferential wall of the housing at a region in which the housing and the movable ring overlap, ribs are disposed on a peripheral surface of the movable ring at a region where the housing and the movable ring overlap, the ribs make a gas from the through holes flow into a gap between the housing and the movable ring by rotation of the movable ring, and further, incline in a direction along which a gas current towards a side of the tank occurs in a gap between the housing and the movable ring, and a liquid which enters the gap between the housing and the movable ring is pushed back to a side of the tank by means of the gas current.

15 Claims, 9 Drawing Sheets

CLEANER FOR BOTH DRY AND WET USE HAVING A MOVEABLE RING CONNECTED TO A FAN, THE MOVEABLE RING HAVING CIRCUMFERENTIAL RIBS

BACKGROUND OF THE INVENTION

The present invention relates to a cleaner for both dry and wet use capable of sucking not only a solid but also a semisolid and liquid.

There is an electric cleaner which is constructed so that sucked dust is collected in a paper pack that is set in a main body. On the other hand, there is a type in which water and so forth is accumulated in a main body and this is used as a filter.

Out of them, the latter is called a cleaner for both dry and wet use, and has a merit that an exhausted air is clean, compared with the former. Also, basically, the former can suck only a solid. However, the latter, that is to say, the cleaner for both dry and wet use can suck not only a solid but also a semisolid and liquid.

Here, this cleaner for both dry and wet use will be simply explained by using FIG. 10 showing its outline structure.

As understood from the figure, a conventional type of the cleaner for both dry and wet use (referred to as a conventional cleaner, hereinafter) has a tank 41 in which water is accumulated. This tank 41 is connected to a suction hose (not shown) through a lead-in tube 42.

On the other hand, a housing 43 is disposed above the tank 41. Also, above this housing 43, an electric fan 44 for suction is further installed.

In addition, a fan 45 for gas-liquid separation exists in the tank 41. Also, a movable ring 46 is attached on an upper end side of this fan 45 for gas-liquid separation. Especially, the movable ring 46 is contained in the above-described housing 43 so that a gap between the movable ring and an inner circumferential surface of the housing does not exist. And, the movable ring 46 is subject to a drive force of the electric fan 44 and rotates together with the fan 45 for gas-liquid separation.

Now, in the cleaner having such an arrangement, when the electric fan 44 is operated, an air current toward a lower side to an upper side occurs, and a pressure in the tank 41 is reduced. As a result, dust is sucked from the suction hose to the tank 41, and is accumulated in the tank. On the other hand, an air sucked together with the dust passes through the fan 45 for gas-liquid separation, the movable ring 46 and the electric fan 44 in order, and is exhausted to outside again. In addition, at this time, water which is scattered in the tank 41 is also carried to a side of the electric fan 44 by the air current. However, since the fan 45 for gas-liquid separation rotates at a high speed, only an air can pass through this fan 45 for gas-liquid separation. Accordingly, trouble does not occur, in which water reaches the electric fan 44 and makes it go wrong.

By the way, in such a conventional cleaner for both dry and wet use, there is the following task:

In other words, in the conventional type of the cleaner for both dry and wet use, it is impossible to increase the suction force so much. Namely, limitation of an output of a motor is set. This is why, if the suction force is increased over a certain fixed value, water is sucked up through the gap between the housing 43 and the movable ring 46. The sucked water reaches the electric fan 44 soon and makes it go wrong.

Incidentally, as mentioned above, airtightness is fully maintained between the housing 43 and the movable ring 46. In other words, the gap therebetween is extremely small. However, when the suction force becomes to be more than or equal to a fixed value, even though the gap is so small, water is sucked up from the gap.

If the gap between the housing 43 and the movable ring 46 is completely zero, such a task does not occur. However, the movable ring 46 rotates at a high speed with respect to the housing 43. Accordingly, naturally, it is impossible to make the gap zero.

SUMMARY OF THE INVENTION

Therefore, the objective of the present invention is to solve the above-mentioned task.

Also, a task to be solved by the present invention is to provide a cleaner for both dry and wet use, in which a liquid is not sucked up from the gap between the housing and the movable ring.

This task is solved by a cleaner for both dry and wet use comprising:

suction means;

a fan for gas-liquid separation which rotates by means of operation of the above-described suction means;

a movable ring disposed above the above-described fan for gas-liquid separation so as to rotate together with the above-described fan for gas-liquid separation;

a housing in which at least a part of an upper end side of the above-described movable ring is contained; and a tank which is below the above-described housing, in which a liquid is stored and at least a part of a lower end side of the above-described fan for gas-liquid separation is contained, and the above-described cleaner being constructed so that an object to be sucked is sucked into the above-described tank by making the above-described suction means operate, wherein through holes are formed in a circumferential wall of the above-described housing, which corresponds to a region in which the above-described housing and the above-described movable ring overlap with each other, ribs which incline with respect to a rotational center axis of the above-described movable ring are disposed on a peripheral surface of the above-described movable ring, which corresponds to a region in which the above-described housing and the above-described movable ring overlap with each other, the above-described ribs make a gas from the above-described through holes flow into a gap between the above-described housing and the above-described movable ring by rotation of the above-described movable ring, and further, incline in a direction along which a gas current towards a side of the above-described tank occurs in a gap between the above-described housing and the above-described movable ring, and a liquid which enters the gap between the above-described housing and the above-described movable ring is pushed back to a side of the above-described tank by means of a gas current generated in the gap between the above-described housing and the above-described movable ring by operation of the above-described ribs when the above-described suction means is operated.

Especially, the above-described task is solved by a cleaner for both dry and wet use comprising:

suction means;

a first fan for receiving a gas current generated by a suction force of the above-described suction means and rotating;

a second fan for gas-liquid separation, which is below the above-described first fan, for rotating together with the above-described first fan;

a housing in which the above-described first fan is rotatably contained;

a movable ring disposed between the above-described first fan and the above-described second fan so as to rotate together with the above-described first fan and the above-described second fan, and of which at least a part of an upper end side is contained in the above-described housing; and a tank which is below the above-described housing, in which a liquid is stored and at least a part of a lower end side of the above-described second fan is contained, the above-described cleaner being constructed so that an object to be sucked is sucked into the above-described tank by making the above-described suction means operate, wherein through holes are formed in a circumferential wall of the above-described housing, which corresponds to a region in which the above-described housing and the above-described movable ring overlap with each other, ribs which incline with respect to a rotational center axis of the above-described movable ring are disposed on a peripheral surface of the above-described movable ring, which corresponds to a region in which the above-described housing and the above-described movable ring overlap with each other, the above-described ribs make a gas from the above-described through holes flow into a gap between the above-described housing and the above-described movable ring by rotation of the above-described movable ring, and further, incline in a direction along which a gas current towards a side of the above-described tank occurs in a gap between the above-described housing and the above-described movable ring, and a liquid which enters the gap between the above-described housing and the above-described movable ring is pushed back to a side of the above-described tank by means of a gas current generated in the gap between the above-described housing and the above-described movable ring by operation of the above-described ribs when the above-described suction means is operated.

Furthermore, the above-described task is solved by a cleaner for both dry and wet use comprising:

suction means;

a first fan for receiving a gas current generated by a suction force of the above-described suction means and rotating;

a second fan for gas-liquid separation, which is below the above-described first fan, for rotating together with the above-described first fan;

a housing in which the above-described first fan is rotatably contained;

a movable ring disposed between the above-described first fan and the above-described second fan so as to rotate together with the above-described first fan and the above-described second fan, and of which at least a part of an upper end side is contained in the above-described housing; and a tank which is below the above-described housing, in which a liquid is stored and at least a part of a lower end side of the above-described second fan is contained, the above-described cleaner being constructed so that an object to be sucked is sucked into the above-described tank by making the above-described suction means operate, wherein a plurality of through holes are formed at an equal interval in a circumferential wall of the above-described housing, which corresponds to a region in which the above-described housing and the above-described movable ring overlap with each other, a plurality of spiral ribs which incline with respect to a rotational center axis of the above-described movable ring are disposed at an equal interval on a peripheral surface of the above-described movable ring, which corresponds to a region in which the above-described housing and the above-described movable ring overlap with each other, the above-described ribs make a gas from the above-described through holes flow into a gap between the above-described housing and the above-described movable ring by rotation of the above-described movable ring, and further, incline in a reverse direction with respect to vanes constituting the above-described first fan so as to generate a gas current towards a side of the above-described tank in a gap between the above-described housing and the above-described movable ring, and a liquid which enters the gap between the above-described housing and the above-described movable ring is pushed back to a side of the above-described tank by means of a gas current generated in the gap between the above-described housing and the above-described movable ring by operation of the above-described ribs when the above-described suction means is operated.

In addition, with regard to the above-described cleaner for both dry and wet use, it can be constructed so that a large diameter portion of which inner diameter is larger than that of other parts is formed on a side of a lower end of the housing, the through holes are disposed in a circumferential wall of this large diameter portion, and the ribs are disposed in a region corresponding to the large diameter portion.

Also, in order to increase inflow efficiency of a gas, it is preferable that a plurality of the through holes are formed in the circumferential wall of the housing at an equal interval. Especially, it is preferable that a plurality of the through holes are formed at intervals of 10–180°. Furthermore, due to the same reason, it is preferable that the through holes are circular holes of which diameter is 1–3 mm. However, the through holes in the present invention include not only a circular hole, a quadrangular hole and a polygonal hole, but also a strip of hole. For example, a slit and so forth is included in the through holes in the present invention.

On the other hand, in order to prevent breakdown of the ribs due to a centrifugal force by means of high speed rotation, it is preferable that the ribs are disposed integrally with the movable ring.

Also, in order to send a gas which has flowed in from the through holes to a side of the tank efficiently, it is preferable that a plurality of the ribs are disposed on the peripheral surface of the movable ring at an equal interval.

And, it is preferable that a projection length of the ribs in a circumferential direction of the peripheral surface of the movable ring is 30–180° as an opening angle. Also, the ribs may have a shape corresponding to a part of a virtual spiral on the peripheral surface of the movable ring.

Furthermore, especially in order to send a gas which has flowed in from the through holes to a side of the tank efficiently, that is to say, in order to form a more powerful gas current toward a side of the tank, it is preferable that a tilt angle of the ribs with respect to a rotational center axis of the movable ring is 10–80°. In other words, it is preferable that a tilt angle of the ribs with respect to a circumference direction of a peripheral surface of the movable ring is 10–80°.

Also, due to the same reason, it is preferable that height of the ribs is 1/50–1/10 of an outer diameter of the movable ring. Furthermore, it is preferable that a cross section of the ribs is a quadrangle.

In addition to this, in the cleaner for both dry and wet use in the present invention, in order to lower the center of gravity and enhance stability, it is preferable that the suction means is disposed on a side of the housing and the tank, and that the suction means and the housing are connected to each other through a duct in the shape of an inverse U letter.

Now, as mentioned above, in the present invention, the through holes are formed in the circumferential wall of the housing, and on the other hand, the ribs which incline with respect to a rotational center axis of the movable ring are disposed on a peripheral surface of the movable ring. Especially, these ribs make a gas from the through holes flow into a gap between the housing and the movable ring by rotation of the movable ring, and further, incline in a direction along which a gas current towards a side of the tank occurs in this gap. And, as a result, in the cleaner for both dry and wet use in the present invention, a liquid which enters the gap between the housing and the movable ring is pushed back to a side of the tank by means of a gas current generated in the gap by operation of the ribs when the suction means is operated. Accordingly, during suction, a liquid is not sucked up from the gap between the housing and the movable ring, and trouble of the suction means (for example, a motor), which is caused by the suction of the liquid, does not occur. Therefore, in the cleaner for both dry and wet use in the present invention, compared with the conventional cleaner, it is possible to drastically increase a suction force.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Below, by referring to FIG. 1 to FIG. 8, an embodiment of the present invention will be explained in detail.

Figure 1:
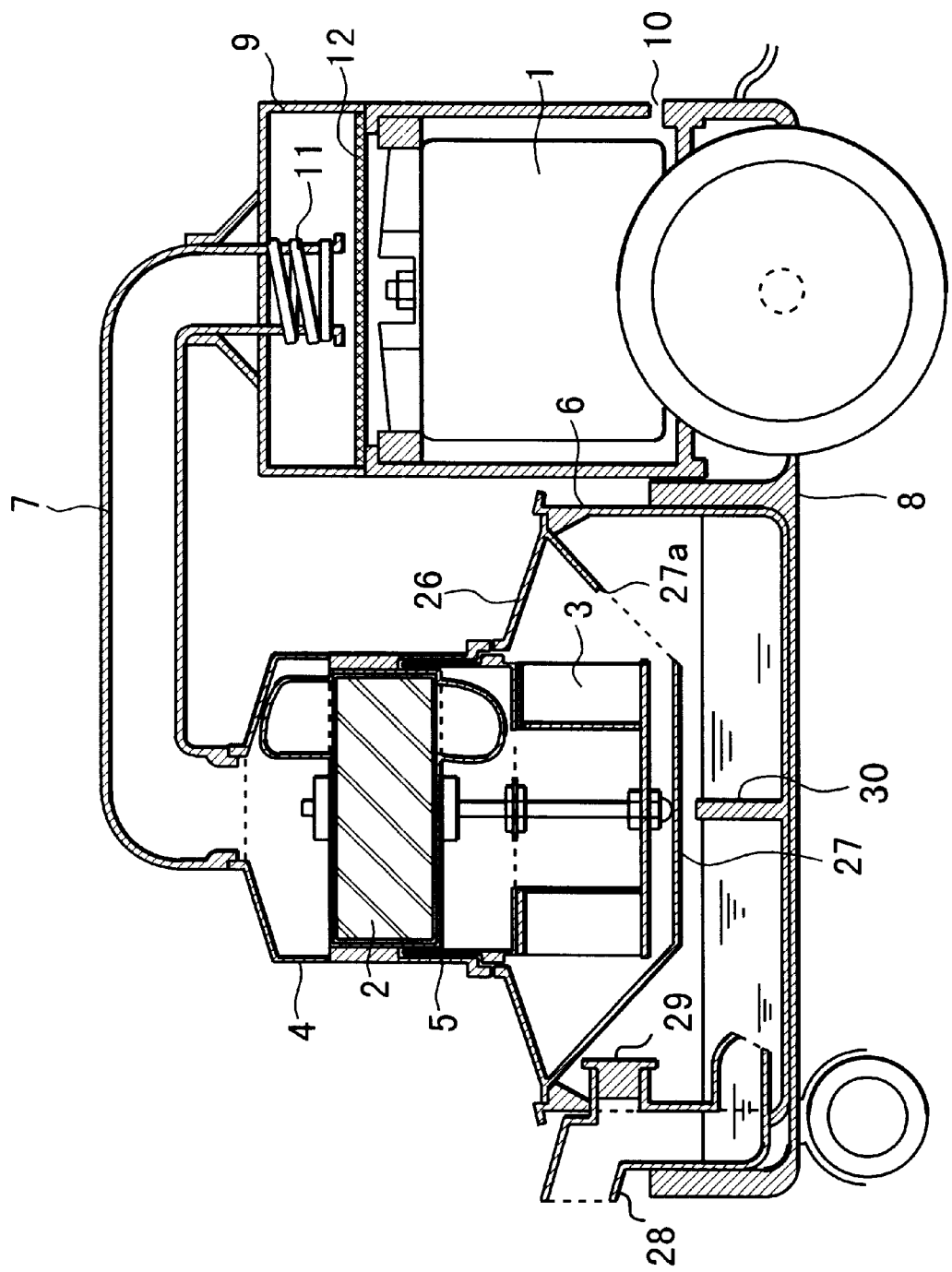
FIG. 1 is a whole schematic cross sectional view of a cleaner for both dry and wet use in accordance with an embodiment of the present invention.
Figure 2:
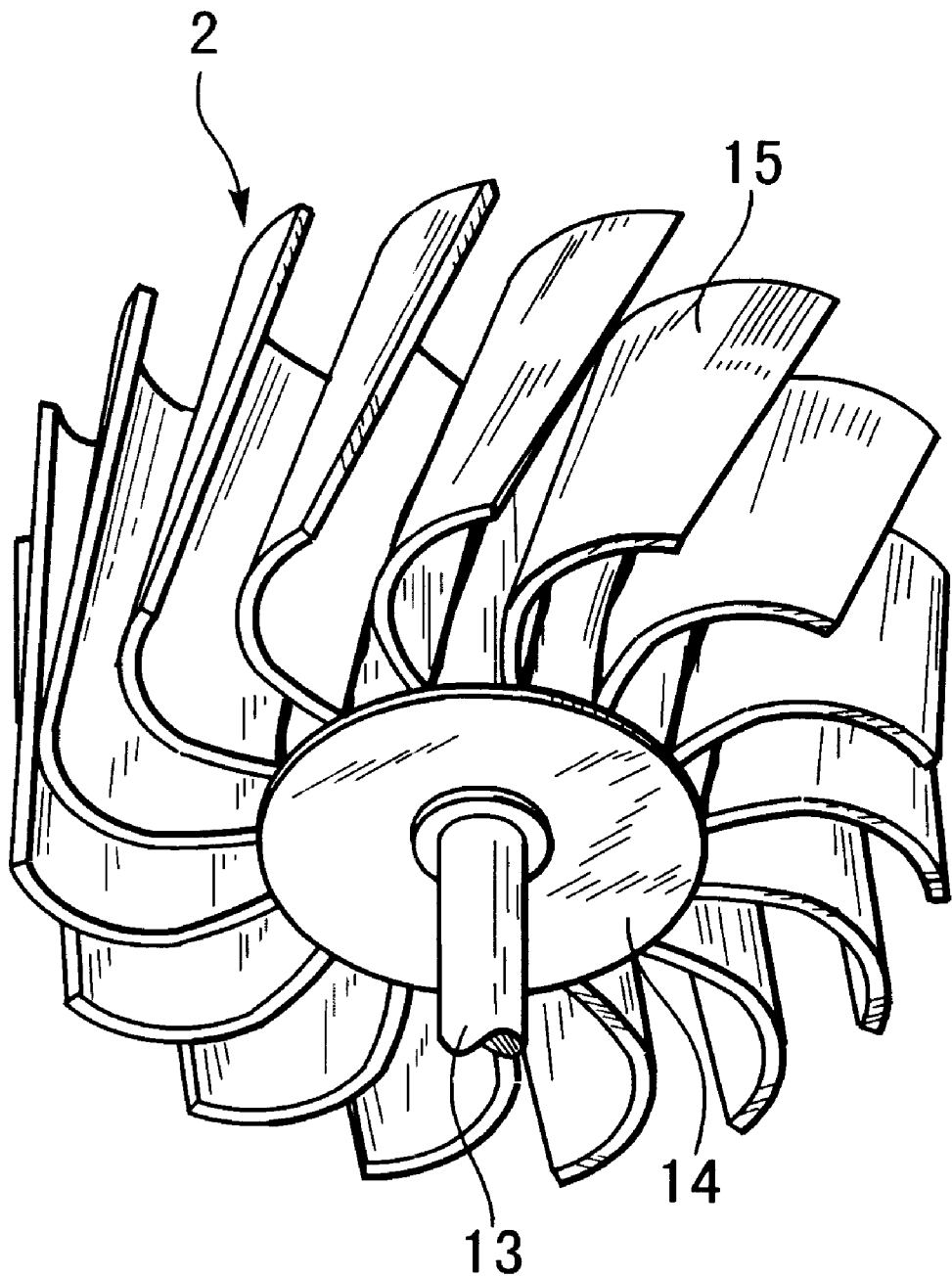
FIG. 2 is a perspective view of a first fan.
Figure 3:
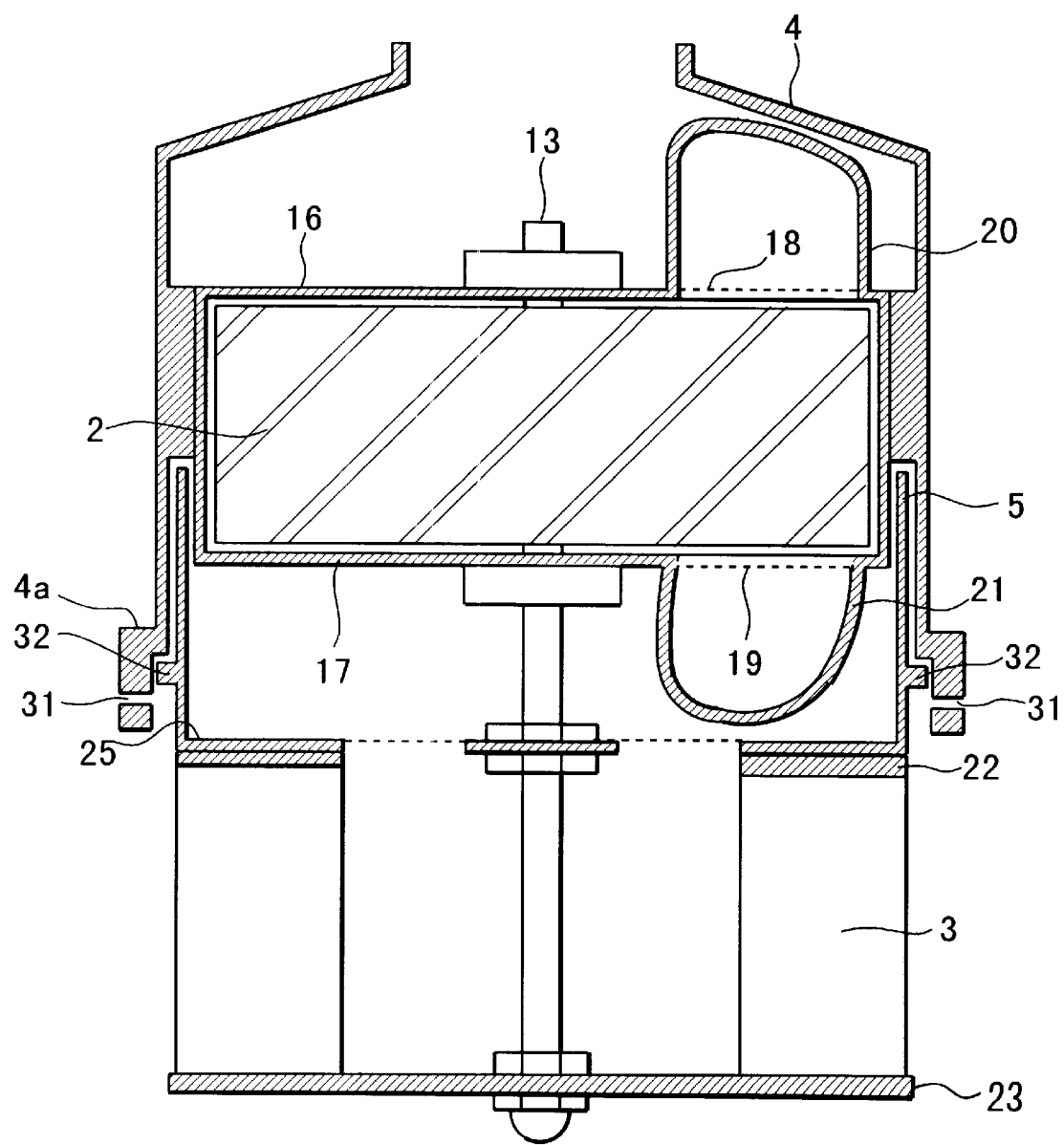
FIG. 3 is a cross sectional view in which a main part of a cleaner for both dry and wet use in accordance with an embodiment of the present invention is enlarged.
Figure 4:
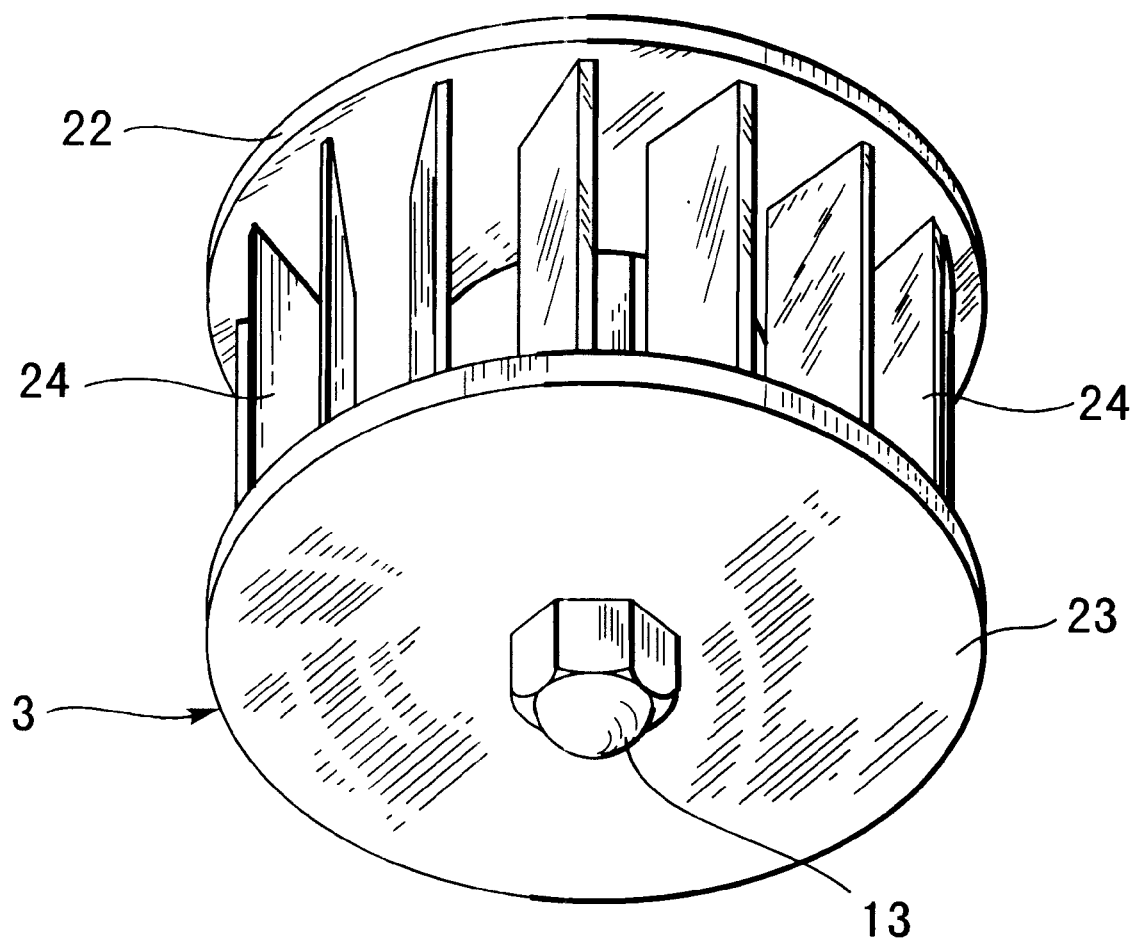
FIG. 4 is a perspective view of a second fan.
Figure 5:
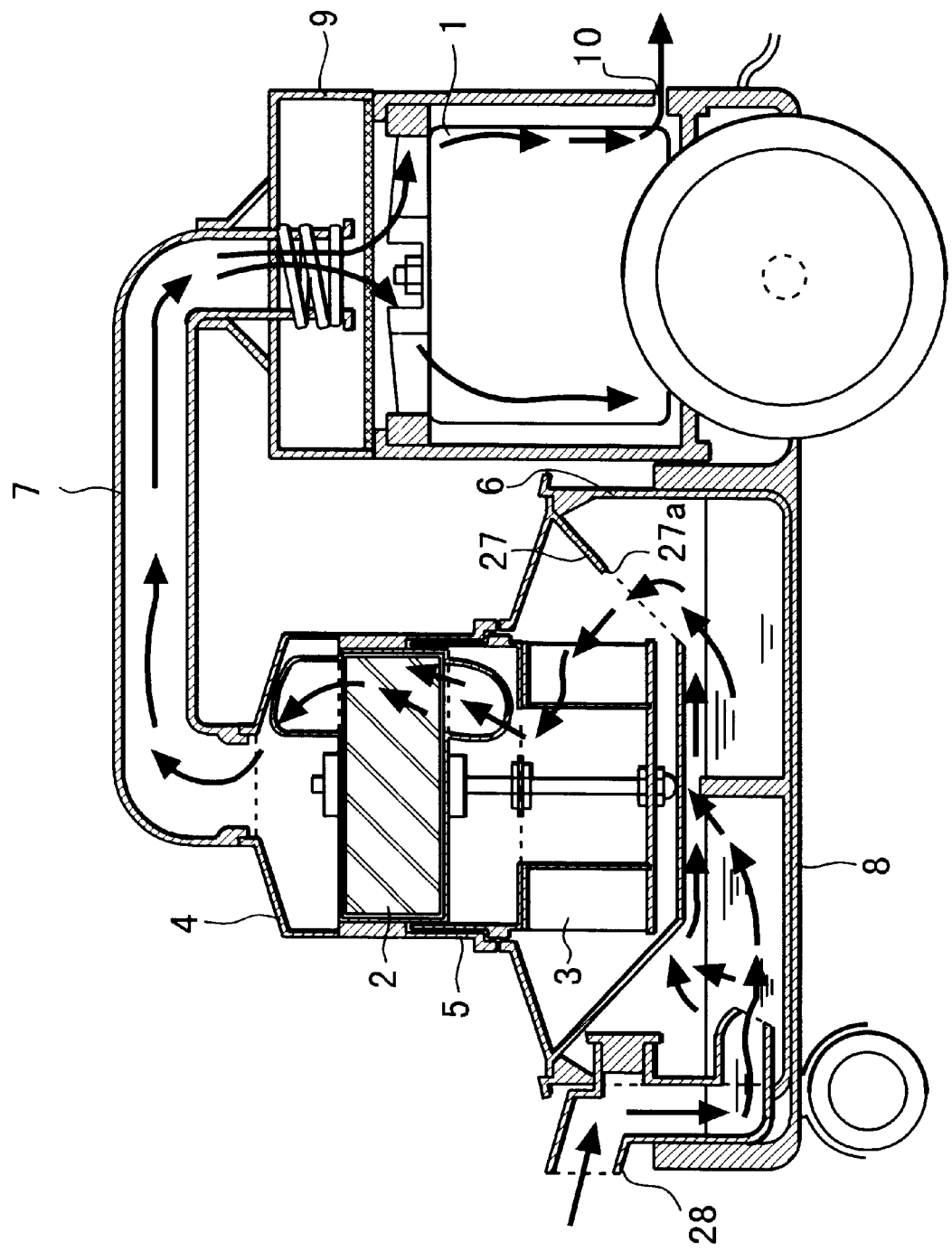
FIG. 5 is a whole schematic cross sectional view showing a function of a cleaner for both dry and wet use in accordance with an embodiment of the present invention.
Figure 6:
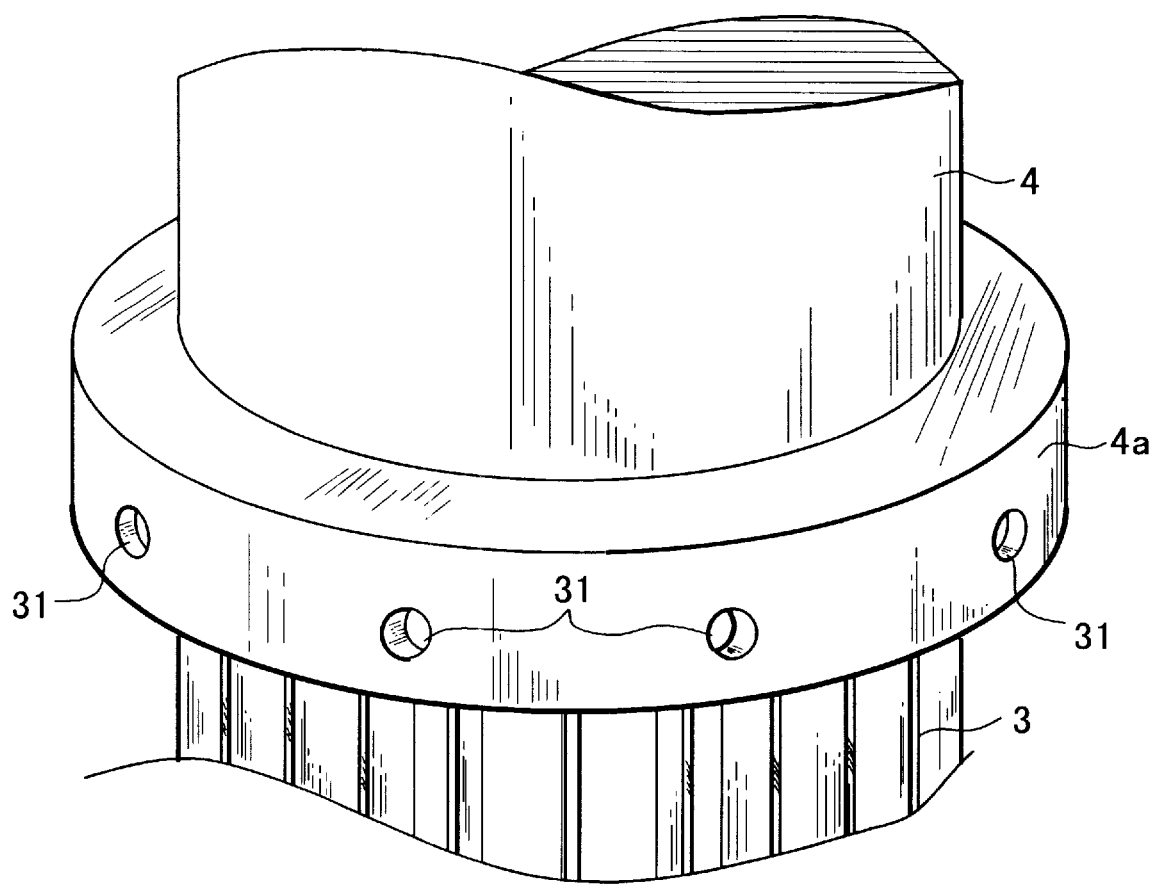
FIG. 6 is a perspective view of a main part of a housing.
Figure 7:
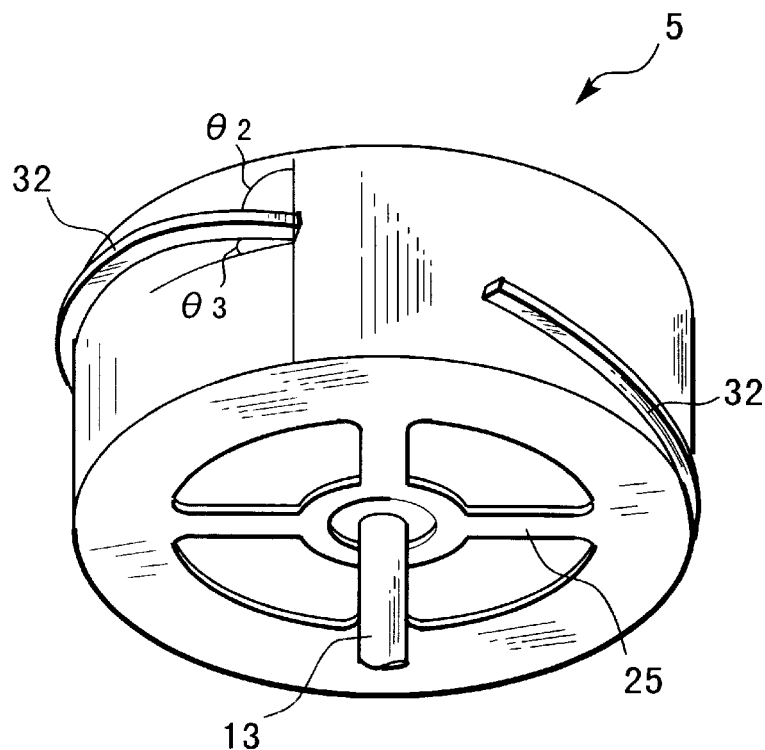
FIG. 7 is a perspective view of a movable ring.
Figure 8:
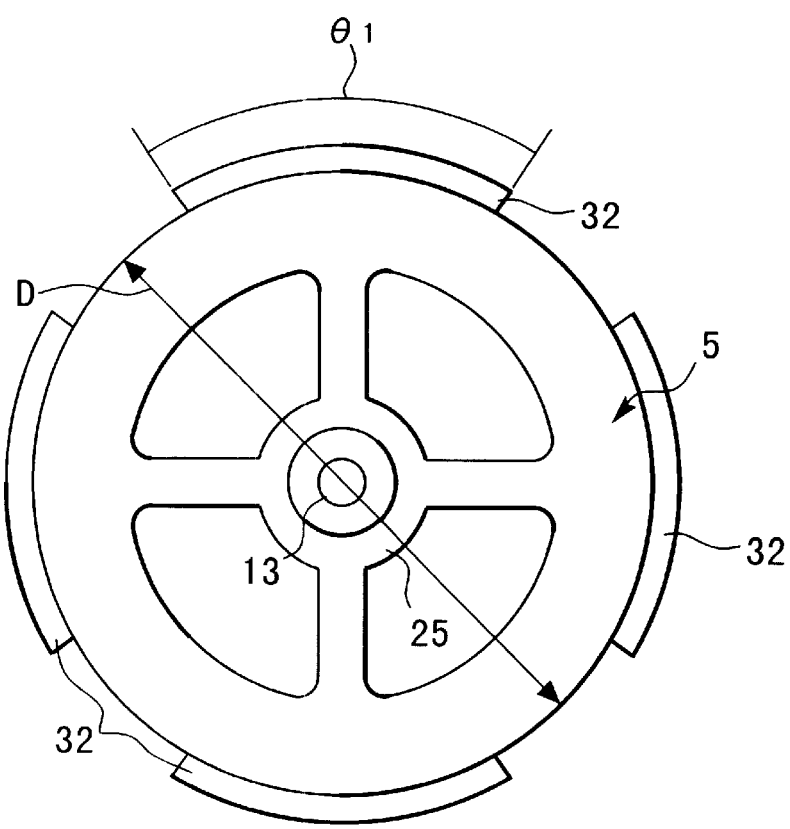
FIG. 8 is a bottom view of the movable ring.

Here, FIG. 1 is a whole schematic cross sectional view of a cleaner for both dry and wet use in accordance with this embodiment, FIG. 2 is a perspective view of a first fan, FIG. 3 is a cross sectional view in which a main part of the cleaner for both dry and wet use in accordance with this embodiment is enlarged, FIG. 4 is a perspective view of a second fan, FIG. 5 is a whole schematic cross sectional view showing a function of a cleaner for both dry and wet use in accordance with this embodiment, FIG. 6 is a perspective view of a main part of a housing, and FIG. 7 and FIG. 8 are a perspective view and a bottom view of a movable ring, respectively.

Now, as understood from FIG. 1, a cleaner for both dry and wet use in accordance with this embodiment includes, as main constitution elements, suction means 1, a first fan 2, a second fan 3 for gas-liquid separation, a housing 4, a movable ring 5, a tank 6, and a duct 7 in the shape of an inverse U letter, which connects the suction means 1 to the housing 4.

Out of them, the suction means 1 is an electric type, and includes a fan for generating an air(gas) current. And, as also mentioned about other elements, the suction means 1 is set on a base 8 of a tricycle type. More particularly, the suction means 1 is contained in a case 9 which is fixed to the base 8. In addition, an opening 10 is disposed at a lower end portion of this case 9. An exhaust air from the above-described suction means 1 is exhausted from this opening 10 to an outside. Incidentally, in this embodiment, in order to realize stabilization due to lowering of the center of gravity, the suction means 1 is set in a side of the housing 4 and the tank 6.

One end of the duct 7 for connecting the housing 4 to the suction means 1 is attached to the case 9 through a spring 11. Especially in this embodiment, the spring 11 is constructed so as to draw one end of the duct 7 into the case 9. On the other hand, other end of the duct 7 is detachable to the housing 4. In addition, a filter 12 is placed between one end of the duct 7 and the suction means 1.

Next, a first fan 2 is disposed within the housing 4 (the detailed structure thereof will be explained later.). This first fan 2 receives an air current which is generated by a suction force of the suction means 1, and rotates. The first fan 2 has shape as shown in FIG. 2. In other words, the first fan 2 has structure in which a number of vanes 15 are slopingly disposed around a base portion 14 which is fixed to a rotational center axis 13.

As seen from FIG. 3, the first fan 2 is supported by using an up-and-down pair of supporting plates 16 and 17 in the housing 4, In other words, the housing 4 rotatably supports the first fan 2. In addition, in the supporting plates 16 and 17, openings 18 and 19 are formed at the same position, respectively. And, hoods 20 and 21 of which one side surface is opened are set, respectively, so as to cover these openings 18 and 19. Incidentally, these hoods 20 and 21 are set for adjusting a direction of an air(gas) current in the housing 4.

Next, with regard to the second fan 3 for gas-liquid separation, this second fan 3 is attached below of the first fan 2 so as to rotate together with the first fan 2. In other words, the second fan 3 shares a rotational center axis with the first fan 2. The second fan 3 has shape as shown in FIG. 4. Particularly, the second fan 3 has structure in which a number of vanes 24 are slopingly disposed between rotational palates 22 and 23 which are fixed to the rotational center axis 13.

The above-described movable ring 5 is disposed between the first fan 2 and the second fan 3. (Correctly, a lower end portion of the first fan 2 is contained in the movable ring 5.)

And, the movable ring 5 shares the rotational center axis with the first fan 2 and the second fan 3. In other words, the movable ring 5 rotates together with the first fan 2 and the second fan 3. Also, almost entire movable ring 5 is contained in the above-described housing 4. Incidentally, a bottom plate 25 in the shape of a cross exists in this movable ring 5. The movable ring 5 is fixed to the above-described rotational center axis 13 using this bottom plate 25. In addition, the detailed structure of the movable ring 5 will be explained later.

Furthermore, the tank 6 which constitutes the cleaner for both dry and wet use in accordance with this embodiment together with the above-described elements is disposed below the housing 4. More particularly, the housing 4 and the tank 6 are connected to each other through a toroidal lid 26 in which a circular hole is formed at its center. The above-described second fan 3 protrudes into the tank 6 from the circular hole of this lid 26. In other words, almost entire second fan 3 is contained in the tank 6. In addition, in order to maintain full airtightness, packing members are interposed at respective connecting portions of the lid 26, and the housing 4 and the tank 6, although they are not shown especially in the figures. Also, the lid 26 can be separated from any one of the housing 4 and the tank 6, if necessary.

Water (liquid) is accumulated within the tank 6. Accordingly, the water is excessively scattered during suction. Therefore, in this embodiment, a scatter suppressing plate 27 is set below the second fan 3. An opening 27a is formed in this scatter suppressing plate 27, and the sacked air reaches a space in which the second fan 3 is disposed through this opening 27a.

In addition, a lead-in tube 28 to which a suction hose (not shown) is connected is attached to the tank 6. This lead-in hose 28 is divided into two parts, and one of them is used in accordance with its application. However, an opening of a part of the lead-in tube 28, which is not used, becomes to be closed by a plug 29.

Furthermore, a pin 30 for sensing a water level is formed in a bottom surface of the tank 6. Accordingly, actually, the tank 6 is filled with water to the extent that this pin 30 is hidden.

The cleaner for both dry and wet use in accordance with this embodiment, which is structured as mentioned above, functions below (referred to FIG. 5).

First, when the suction means 1 is operated, the first fan 2 receives an air(gas) current generated by a suction force thereof, and rotates at a high speed. At the same time, since a pressure in the tank 6 is reduced, an object to be sucked is sucked into the tank 6 from the suction hose connected to the lead-in tube 28.

Then, the object to be sucked is mixed with water within the tank 6, and remains in the tank 6 as it is. To the contrary, an external air (shown as an arrow in the figure) which has been sucked together with the object to be sucked enters a space in which the second fan 3 is disposed, from the opening 27a of the scatter suppressing plate 27 together with the scattered water.

However, in this space, the second fan 3 rotates at a high speed together with the first fan 2. Accordingly, the water which has entered the space is scattered. As a result, only an air(gas) can pass through the second fan 3.

Next, the air which has passed through the second fan 3 is taken from the hood 21 into the first fan 2 which is rotating at a high speed, and is exhausted from the hood 20. Thereafter, the exhausted air reaches the suction means 1 through the duct 7, and finally, is exhausted to an external from an opening 10.

Successively, main structure of the cleaner for both dry and wet use in accordance with this embodiment will be further explained using FIG. 6 to FIG. 8.

As mentioned above, the cleaner for both dry and wet use in accordance with this embodiment includes the housing 4 and the movable ring 5. And, the movable ring 5 is constructed so as to rotate at a high speed with respect to the housing 4.

Now, on a lower end side of the above-described housing 4, a large diameter portion 4a of which an inner diameter (and an outer diameter) are larger than those of other part is formed. Especially, this large diameter portion 4a exists in a region in which the housing 4 and the movable ring 5 overlap with each other. And, as seen from FIG. 6, in a circumferential wall of the large diameter portion 4a in the housing 4, a plurality of through holes 31 are formed at an equal interval. Incidentally, in this embodiment, as these through holes 31, twelve holes in total are formed at an interval of about 300. Also, the through holes 31 have circular shape, and a diameter thereof is about 1.5 mm. However, the interval, number and diameter and so forth of the through holes 31 are not limited to those in this embodiment. They can be changed if necessary.

On the other hand, as shown in FIG. 7 and FIG. 8, on a peripheral surface of the above-described movable ring 5, spiral ribs 32 which incline with respect to the rotational center axis 13 are disposed. Especially, these spiral ribs 32 are formed in a peripheral surface of the movable ring 5 (especially in a region corresponding to the large diameter portion 4a), which corresponds to a region in which the housing 4 and the movable ring 5 overlap with each other. In other words, the spiral ribs 32 are constructed so as to be positioned within the large diameter portion 4a in the above-described housing 4. However, a gap between the spiral ribs 32 and an inner peripheral surface of the large diameter portion 4a is designed to be so small.

Furthermore, a plurality of these spiral ribs 32 are disposed at an equal interval on an outer peripheral surface of the movable ring 5. Particularly, on the outer peripheral surface of the movable ring 5, four spiral ribs 32 in total exist. And, these spiral ribs 32 incline in a reverse direction with respect to the vanes 15 which constitute the above-described first fan 2. In other words, the spiral ribs 32 makes an external air flow into a gap between the housing 4 and the movable ring 5 from the through holes 31 by means of rotation of the movable ring 5. And, the spiral ribs 32 function so as to push the external air which has flowed into the gap toward a side of the tank 6. In other words, the spiral ribs 32 are constructed so as to generate an air (gas) current toward a side of the tank 6 in a gap between the housing 4 and the movable ring 5.

Incidentally, in this embodiment, the spiral ribs 32 are disposed integrally with the movable ring 5. Also, as seen from their name, the spiral ribs 32 have shape corresponding to a part of a virtual spiral in the outer peripheral surface of the movable ring 5. Further, a projection length of the spiral ribs 32 in a circumferential direction of the outer peripheral surface of the movable ring 5 is 60–90° as an opening angle (shown as θ1 in FIG. 8). Also, a cross section of the spiral ribs 32 is a quadrangle, and height thereof is about ⅟18 of an outer diameter (shown as D in FIG. 8) of the movable ring 5. In addition to this, a tilt angle (shown as θ2 in FIG. 7) of the spiral ribs 32 with respect to the rotational center axis 13 of the movable ring 5 is 65°. In other words, a tilt angle (shown as θ3 in FIG. 7) of the spiral ribs 32 with respect to a circumferential direction of the outer peripheral surface of the movable ring 5 is 25°.

However, like the through holes 31, the length, shape in a longitudinal direction, cross sectional shape, tilt angle and so forth of the above-described spiral ribs 32 are not limited to those in this embodiment. They can be changed if necessary.

Now, in the cleaner for both dry and wet use in accordance with this embodiment, which includes the above-described housing 4 and the movable ring 5, when the suction means 1 is operated, water within the tank 6 tries to enter the gap between the housing 4 and the movable ring 5. However, as mentioned above, by means of the operation of the spiral ribs 32 which rotate at a high speed, a strong downward air current occurs in the gap between the housing 4 and the movable ring 5. Accordingly, the water which tries to enter the gap is pushed back to the tank 6 by this air current. Therefore, during suction, water cannot be sucked up from the gap between the housing 4 and the movable ring 5, and trouble of the suction means 1, which is caused by this suction of the water, does not occur. As a result, in the cleaner for both dry and wet use in accordance with this embodiment, compared with the conventional cleaner, it becomes to be possible to drastically increase a suction force.

In addition, naturally, the present invention is not limited to the above-described embodiments. The present invention can be worked by adding an appropriate change thereto within its scope and without deviating from its spirit, main feature and technical idea.

For example, the first fan 2 may be omitted by placing the suction means 1 on the housing 4. In this case, the second fan 3 is directly connected to a rotational axis of the suction means 1, and is directly rotated by the suction means 1. However, a function thereof is the same as that explained above.

Figure 9:
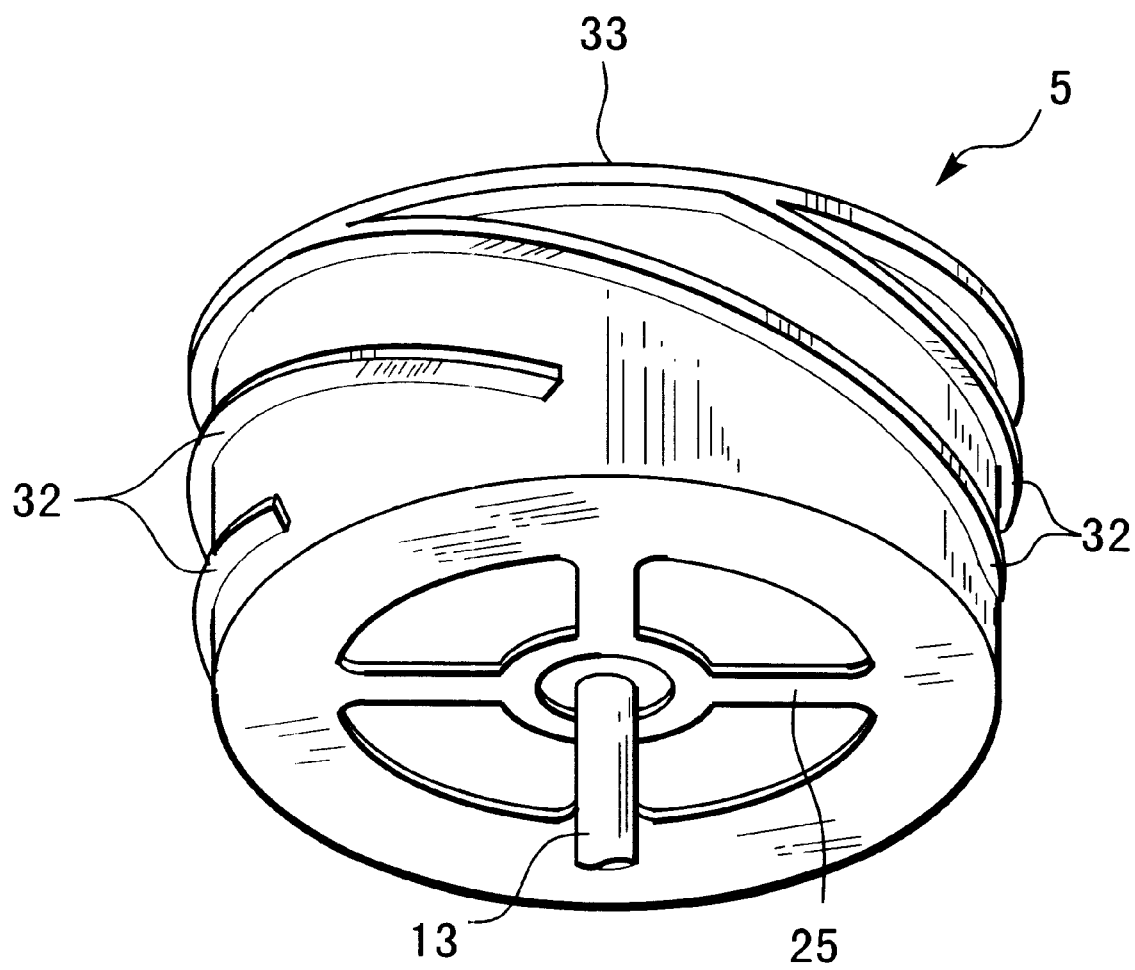
FIG. 9 is a perspective view showing another embodiment of a movable ring.
Figure 10:
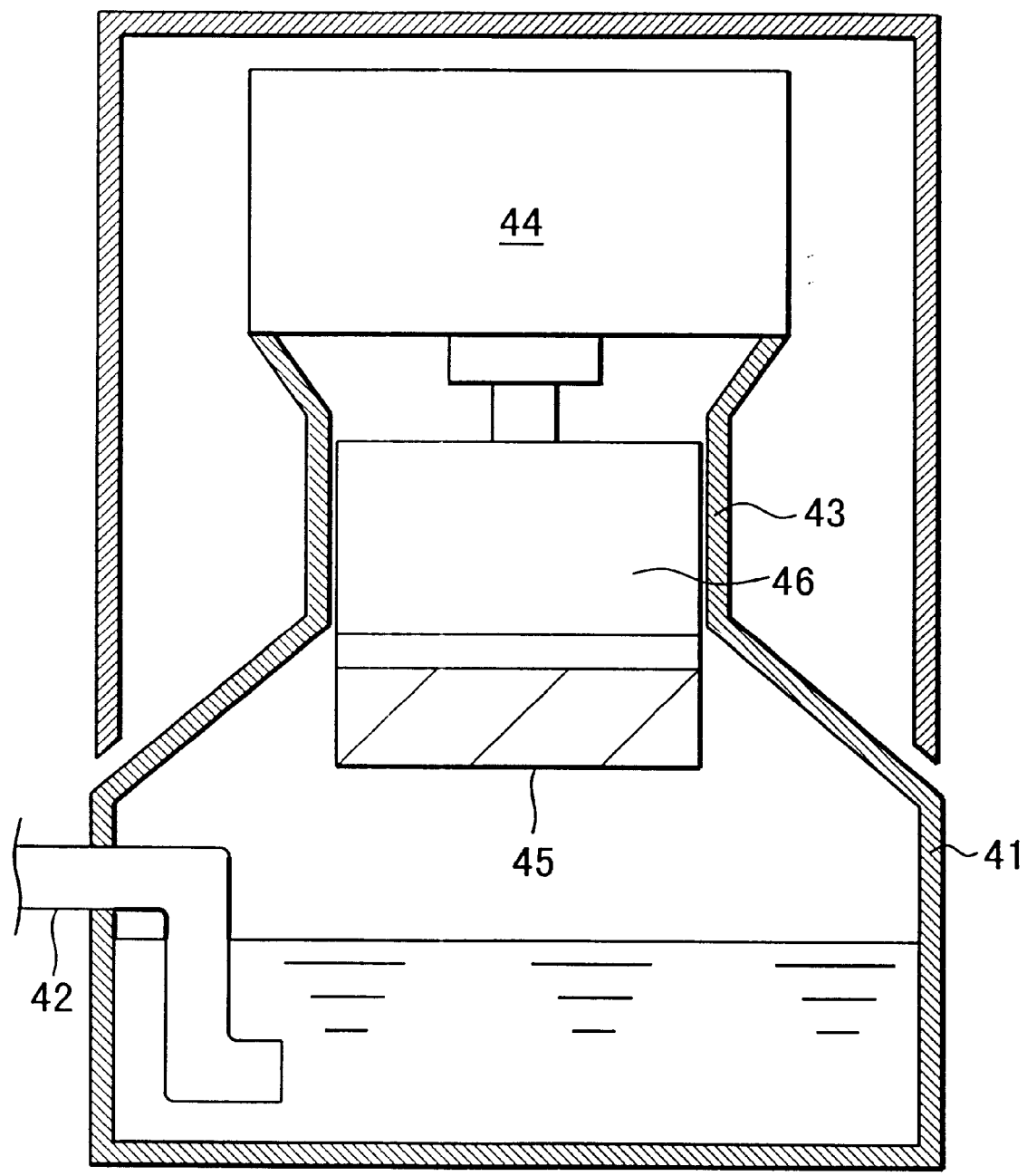
FIG. 10 is a schematic cross sectional view of a conventional cleaner for both dry and wet use.

Also, with regard to the movable ring in which the spiral ribs are disposed, an annular flange can be formed at an upper end portion of the movable ring. The condition in which this flange is formed is shown in FIG. 9. An element shown as a reference numeral 33 in the figure is the flange. (Reference numerals used in FIG. 7 are used for other reference numerals.) This flange 33 acts a role for intercepting water which tries to enter a side of the suction means. Accordingly, due to synergism with a downward air current, trouble of the suction means becomes to be harder to occur. In case of providing the flange 33 as shown in FIG. 9, however, the large diameter portion of the housing will be enlarged in a height direction, which corresponds to the flange.

Furthermore, the main structure (the structure in which a liquid cannot be sucked up from a gap between a fixed portion and a rotational portion) of the present invention can be utilized other than the cleaner for both dry and wet use. For example, in an apparatus and equipment including a conduit in which a gas flows together with a droplet, the structure can be provided in this conduit.

In the cleaner for both dry and wet use of the present invention, when the suction means is operated, liquid which enters a gap between the housing and the movable ring is pushed back to a side of the tank by an air(gas) current generated in the gap by means of operation of the ribs. Accordingly, during suction, liquid cannot be sucked up from the gap between the housing and the movable ring, and trouble of the suction means and so forth, which is caused by this suction of the liquid, does not occur. Therefore, compared with the conventional cleaner, it is possible to drastically increase a suction force.

What is claimed is:

1. A cleaner for both dry and wet use comprising:

suction means;

a fan for gas-liquid separation which rotates by means of operation of said suction means;

a movable ring disposed above said fan for gas-liquid separation so as to rotate together with said fan for gas-liquid separation;

a housing in which at least a part of an upper end side of said movable ring is contained; and a tank which is below said housing, in which a liquid is stored and at least a part of a lower end side of said fan for gas-liquid separation is contained, and said cleaner being constructed so that an object to be sucked is sucked into said tank by making said suction means operate, wherein through holes are formed in a circumferential wall of said housing, which corresponds to a region in which said housing and said movable ring overlap with each other, ribs which incline with respect to a rotational center axis of said movable ring are disposed on a peripheral surface of said movable ring, which corresponds to a region in which said housing and said movable ring overlap with each other, said ribs make a gas from said through holes flow into a gap between said housing and said movable ring by rotation of said movable ring, and further, incline in a direction along which a gas current towards a side of said tank occurs in a gap between said housing and said movable ring, and a liquid which enters the gap between said housing and said movable ring is pushed back to a side of said tank by means of a gas current generated in the gap between said housing and said movable ring by operation of said ribs when said suction means is operated.

2. A cleaner for both dry and wet use comprising:

suction means;

a first fan for receiving a gas current generated by a suction force of said suction means and rotating;

a second fan for gas-liquid separation, which is below said first fan, for rotating together with said first fan;

a housing in which said first fan is rotatably contained;

a movable ring disposed between said first fan and said second fan so as to rotate together with said first fan and said second fan, and of which at least a part of an upper end side is contained in said housing; and a tank which is below said housing, in which a liquid is stored and at least a part of a lower end side of said second fan is contained, said cleaner being constructed so that an object to be sucked is sucked into said tank by making said suction means operate, wherein through holes are formed in a circumferential wall of said housing, which corresponds to a region in which said housing and said movable ring overlap with each other, ribs which incline with respect to a rotational center axis of said movable ring are disposed on a peripheral surface of said movable ring, which corresponds to a region in which said housing and said movable ring overlap with each other, said ribs make a gas from said through holes flow into a gap between said housing and said movable ring by rotation of said movable ring, and further, incline in a direction along which a gas current towards a side of said tank occurs in a gap between said housing and said movable ring, and a liquid which enters the gap between said housing and said movable ring is pushed back to a side of said tank by means of a gas current generated in the gap between said housing and said movable ring by operation of said ribs when said suction means is operated.

3. A cleaner for both dry and wet use according to claim 2, wherein a large diameter portion of which inner diameter is larger than that of other parts is formed on a side of a lower end of said housing, said through holes are disposed in a circumferential wall of said large diameter portion, and said ribs are disposed in a region corresponding to said large diameter portion.

4. A cleaner for both dry and wet use according to claim 2, wherein a plurality of said through holes are formed in the circumferential wall of said housing at an equal interval.

5. A cleaner for both dry and wet use according to claim 2, wherein a plurality of said through holes are formed at intervals of 10–180°.

6. A cleaner for both dry and wet use according to claim 2, wherein said through holes are circular holes of which diameter is 1–3 mm.

7. A cleaner for both dry and wet use according to claim 2, wherein said ribs are disposed integrally with said movable ring.

8. A cleaner for both dry and wet use according to claim 2, wherein a plurality of said ribs are disposed on the peripheral surface of said movable ring at an equal interval.

9. A cleaner for both dry and wet use according to claim 2, wherein a projection length of said ribs in a circumferential direction of the peripheral surface of said movable ring is 30–180° as an opening angle.

10. A cleaner for both dry and wet use according to claim 2, wherein said ribs have a shape corresponding to a part of a virtual spiral on the peripheral surface of said movable ring.

11. A cleaner for both dry and wet use according to claim 10, wherein a tilt angle of said ribs with respect to a rotational center axis of said movable ring is 10–80°.

12. A cleaner for both dry and wet use according to claim 2, wherein height of said ribs is 1/50–1/10 of an outer diameter of said movable ring.

13. A cleaner for both dry and wet use according to claim 2, wherein a cross section of said ribs is a quadrangle.

14. A cleaner for both dry and wet use according to claim 2, wherein said suction means is disposed on a side of said housing and said tank, and said suction means and said housing are connected to each other through a duct in the shape of an inverse U letter.

15. A cleaner for both dry and wet use comprising:

suction means;

a first fan for receiving a gas current generated by a suction force of said suction means and rotating;

a second fan for gas-liquid separation, which is below said first fan, for rotating together with said first fan;

a housing in which said first fan is rotatably contained;

a movable ring disposed between said first fan and said second fan so as to rotate together with said first fan and said second fan, and of which at least a part of an upper end side is contained in said housing; and a tank which is below said housing, in which a liquid is stored and at least a part of a lower end side of said second fan is contained, said cleaner being constructed so that an object to be sucked is sucked into said tank by making said suction means operate, wherein a plurality of through holes are formed at an equal interval in a circumferential wall of said housing, which corresponds to a region in which said housing and said movable ring overlap with each other, a plurality of spiral ribs which incline with respect to a rotational center axis of said movable ring are disposed at an equal interval on a peripheral surface of said movable ring, which corresponds to a region in which said housing and said movable ring overlap with each other, said ribs make a gas from said through holes flow into a gap between said housing and said movable ring by rotation of said movable ring, and further, incline in a reverse direction with respect to vanes constituting said first fan so as to generate a gas current towards a side of said tank in a gap between said housing and said movable ring, and a liquid which enters the gap between said housing and said movable ring is pushed back to a side of said tank by means of a gas current generated in the gap between said housing and said movable ring by operation of said ribs when said suction means is operated.

\* \* \* \* \*